United States Patent

Kinkelin et al.

[11] Patent Number: 5,869,594
[45] Date of Patent: Feb. 9, 1999

[54] COPOLYETHER ESTER HOT-MELT MASSES

[75] Inventors: Eberhard Kinkelin, Chur; Gerhard Poessnecker, Trin; Jürgen Spindler, Domat/Ems, all of Switzerland

[73] Assignee: EMS-Inventa AG, Zurich, Switzerland

[21] Appl. No.: 909,977

[22] Filed: Aug. 12, 1997

[30] Foreign Application Priority Data

Aug. 12, 1996 [DE] Germany .................. 196 32 473.4

[51] Int. Cl.⁶ .................................. C08G 63/66
[52] U.S. Cl. .................. 528/300; 528/272; 528/301; 528/308.6
[58] Field of Search .................. 528/272, 300, 528/301, 308.6

[56] References Cited

U.S. PATENT DOCUMENTS

| | | | |
|---|---|---|---|
| 4,116,925 | 9/1978 | Brachman et al. | 524/494 |
| 4,143,790 | 3/1979 | Ueno et al. | 220/458 |
| 4,156,774 | 5/1979 | Buxbaum et al. | 528/273 |
| 4,335,188 | 6/1982 | Igi et al. | 428/458 |
| 4,452,853 | 6/1984 | Schade et al. | 528/301 |
| 4,500,575 | 2/1985 | Taira et al. | 428/35 |
| 4,725,483 | 2/1988 | Ishii et al. | 428/220 |
| 4,975,477 | 12/1990 | Cox et al. | 524/77 |
| 5,561,213 | 10/1996 | Poessnecker | 528/300 |

FOREIGN PATENT DOCUMENTS 0 072 433  12/1984  European Pat. Off. .
0 204 528   5/1986  European Pat. Off. .

OTHER PUBLICATIONS

Patent Abstract of JP 54/153835—Toray Ind Inc, May 23, 1978.
Patent Abstract of JP 57108177.
Patent Abstract of JP 59011383.
Patent Abstract of JP 58134114.

*Primary Examiner*—Samuel A. Acquah
*Attorney, Agent, or Firm*—Hardaway Law Firm, P.A.

[57] ABSTRACT

The invention relates to novel hot-melt masses consisting of a statistically built-up copolyether ester based on terephthalic acid and a mixture of aliphatic diols. Terephthalic acid is used as the single acid component and its molar amount, relative to the total amount of acid, is 100 molar %. A combination of butane diol, diethylene glycol, polyethylene and optionally triethylene glycol is present as diol component. The molar amount of butane diol is less than 75 molar %, the amount of diethylene glycol is between 5 and 60 molar %, the amount of triethylene glycol between 0 and 40 molar % and at least 2 and at the most 10 molar % of a higher-molecular polyethylene glycol component with a molar mass of 600–4000 g/mole is used, relative to the total acid amount and total diol amount of 100 molar % in each instance. The melting point of the copolyether ester adhesive masses is between 90° and 190° C.

The copolyetherester hot-melt masses can be used in the hot-melt method and for the known other powder coating methods.

11 Claims, No Drawings

COPOLYETHER ESTER HOT-MELT MASSES

The invention relates to thermoplastic copolyether esters for hot-melt applications.

The invention is concerned in particular with linear or branched fast-crystallizing and highly flexible copolyether esters based on terephthalic acid, 1,4-butane diol (BDO), diethylene glycol (DEG) or a mixture of diethylene glycol (DEG) and triethylene glycol (TEG), and a polyethylene glycol (PEG) with an average molecular weight of 600–4000 g/mole. These polyether esters function as hot-melt masses for industrial and textile applications.

The use of various copolyesters and copolyether esters has already been frequently described in the literature.

EP-A-0,204,528 describes copolyester foils for foodstuff packagings consisting of a copolyester with at least 85 molar % terephthalic acid (TPA), 65 to 97 molar % butane diol (BDO) and 3 to 35 molar % of a polyethylene glycol (PEG) with a molar mass between 106 and 550 g/mole. The melting point of these products is between 160° and 200° C. Hot-melt adhesives with such high melting points can not be used in the textile industry.

DE-A-3 32 059 describes a polyether ester system for the adhering of textiles consisting of terephthalic acid (TPA), isophthalic acid (IPA), butane diol and 10–25% of a polyalkylene ether diol with a molar mass of 400–600 g/mole and with a melting point of 95°–125° C.

Even JP 54/153835 describes a hot-melt fiber adhesive of TPA, IPA, butane diol and 1–10% polyalkylene glycol with a molecular weight of 300–6000 g/mole. IPA, which distinctly worsens the crystallization properties, is used in these two documents to lower the melting point.

A thermoplastic mixed polyester is described in DE-A-28 29 375 which consists of TPA, another acid, 15–30 molar % ethylene glycol, diethylene glycol and 0.5.5 molar % polybutylene glycol. A certain amount of ethylene glycol and especially polybutylene glycol are explicitly required here.

DE-A-44 30 048 describes a copolyester of TPA, IPA, butane diol and a mixture of diethylene glycol and triethylene glycol; the melting point here is between 60° C. and 130° C.

Finally, DE-A-27 25 709 describes thermoplastic block copolymers of TPA, butane diol and 1–7%, relative to PBT, polyether with a molecular weight of 600–6000 g/mole. In this patent special polymer blocks are used in contrast to the statistic distribution.

EP-A-0,164,910 describes copolyester foils and hot-melt masses contained in these foils. The copolyester hot-melt adhesives have as components 80 to 97 molar % terephthalic acid and 3 to 20 molar % isophthalic acid and as diol component 60 to 85 molar % 1,4-butane diol and 15 to 40 molar % diethylene glycol. The melting point of these copolyesters is in a range of 160° to 200° C.

All these above-mentioned patents have significant substantial disadvantages and do not result in thermoplastic copolyether ester hot-melt masses with a high crystallization rate and high flexibility which can be used as hot-melt adhesives in industrial applications for difficult substrates.

The present invention had the goal of developing relatively low-melting, fast-crystallizing and highly flexible products for hot-melt adhesive applications.

The advantage of a low melting point resides in particular in the possibility of being able to use lower application temperatures. This is particularly important in the area of industrial bondings when substrates such as, e.g., certain plastics are used which have melting temperatures below 150° C.

The use of a copolyester with high crystallization rate presents itself for various reasons. The formation of crystalline areas is a precondition for the mechanical strength of a polymer above the glass temperature. Thus, the more rapidly these crystalline domains can be formed, the sooner the bonding site can be mechanically stressed. Moreover, the surface adhesiveness of a polymeric hot-melt adhesive is a direct function of its crystallization. The lesser the tendency toward crystallization the longer e.g. coated foils remain tacky. This entails problems e.g. when rolling up these foils since the individual layers can readily adhere to each other, which renders the entire roll unusable. This effect can be circumvented by applying a so-called carrier foil which separates the applied carrier from the next layer. However, this foil must be removed before pressing with the further substrate, which results in increased expense and in particular in waste. Another possibility is constituted by tempering procedures, which are time- and energy intensive and are naturally likewise a significant disadvantage for the entire production process. All these can be eliminated when a fast-crystallizing polymer is used.

The advantage of highly flexible products is obvious in many respects. On the one hand, in the case of bondings in the industrial area, dependent on the substrate, sufficient adhesion values and resistances can only be achieved with flexible adhesive masses.

On the other hand, coated and adhered parts can still be exposed subsequently to tensions and deformations in the case of which traditional adhesives lose their adhesive properties and result in substrate separations. In these instances a highly flexible adhesive is the sole possibility of achieving a permanent union of materials.

The invention therefore has the problem of reconciling by means of a suitable combination of raw materials the three required properties of "relatively low melting point", "high crystallization rate" and "high flexibility" and of making available novel hot-melt adhesive masses consisting of a statistically constructed copolyether ester based on terephthalic acid and a mixture of aliphatic diols.

This problem is solved by the fast-crystallizing and highly flexible copolyether ester hot-melt adhesive masses in accordance with claim 1. Claim 8 indicates special applications of the hot-melt adhesive masses in accordance with the invention.

The subclaims contain special embodiments of the invention.

The solution of the above-named problem is to be found especially in hot-melt adhesive masses consisting of statistically composed copolyether esters with a combination of butane diol (BDO), diethylene glycol (DEG) and polyethylene glycol (PEG) and, selectively, other linear or branched aliphatic diols and terephthalic acid (TPA) as the sole acid component. The viscosity should preferably be above 200 Pa.s at approximately 190° C. in these highly flexible products.

When only terephthalic acid is used as acid component the melting points are in general far above the desired range. A reduction of the melting point is possible by partially replacing the terephthalic acid with another acid such as e.g. isophthalic acid (IPA). However, such a combination worsens the crystallinity and the crystallization rate to a considerable extent.

Surprisingly, the melting point can be lowered by over 80° C. in the present invention by using diethylene glycol as codiol component or a mixture of diethylene glycol and triethylene glycol while retaining at the same time the high crystallization rate.

Although a certain flexibility of the polymer is achieved already by the use of low-molecular ether diols, the goal of producing a highly flexible polymer can be achieved only by the simultaneous use of a higher-molecular ether diol such as e.g. polyethylene glycol 600.

Although there is a large number of patents in the area of adhesives, the monomer combination of the present patent has not yet been described and is unique in its combination and in the properties achieved.

Thus, EP-A-204,528 does describe a copolyester film consisting of 85–100 % TPA, 65–97% butane diol and 3–35% molar % polyethylene glycol with a molecular weight of 106–550 g/mole and with a melting point of 160°–200° C. In comparison to the present invention, the molecular weight range of the polyethylene glycol does not include the polyethylene glycol in accordance with the invention and the melting range is too high on account of the application for adhesive films.

Only terephthalic acid is used as acid component for the copolyether ester hot-melt masses of the invention. The molar amount of butane diol is between 45 and 70 molar% relative to the entire amount of diol whereas the amount of diethylene glycol is between 10 and 50 molar % and the amount of triethylene glycol is selectively between 0 and 35 molar %. A polyethylene glycol with a molar mass of 600–4000 g/mole in the amount of 2–10 molar % is used as higher-molecular polyethylene glycol component. The amount of butane diol can be reduced by up to 3 molar % if a polyvalent alcohol component such as e.g. trimethylolpropane or, optionally, also a β-hydroxyalkyl amide is used to raise the molecular weight of the polymer. The molar percentages stated above refer to the amount of units derived from each component in the product polymer, and are based on the total amount of acid or diol units.

The melting points of the copolyether ester hot-melt masses of the invention are between 90° and 190° C., preferably between 100° and 180° C. The melting viscosity, measured at 190° C. and 2.16 kg load according to DIN/ISO 1133, is not below 100 Pa.s, preferably not below 200 Pa.s.

The advantages of the invention are based on the special action, not described anywhere, of the combination of TPA, butane diol, diethylene glycol, selectively replaced in part by triethylene glycol, and higher-molecular polyethylene glycol which on the one hand shifts the melting point into the desired range and on the other hand is also responsible for the high crystallization rate and especially for the extremely high flexibility.

The copolyether ester hot-melt masses of the invention are primarily used in the hot-melt process on account of their flexibility but can also be used in known powder coating processes.

The following examples are intended to compare the copolyether esters of the invention to other products. Example 9 is a reference example which is not covered by the present invention.

The melting points, glass temperatures and cold crystallization points were carried out with a DSC device of the DuPont company, type 1090B. The maximum of the melting peak is taken as melting point and the middle of the two baselines as glass temperature. The maximum of the crystallization peak during the second heating of the specimen in the DSC is the valid cold crystallization point.

The melting viscosity was determined according to the outflow method at 190° C. and a load of 2.16 kg according to DIN/ISO 1133.

EXAMPLE 1

1.37 kg (1.52 moles) butane diol, 0.98 kg (0.93 mole) diethylene glycol and 0.89 kg (0.15 mole) polyethylene glycol with an average molecular weight of 600 are placed in a 10 l esterification reactor provided with temperature sensor, agitator, reflux column and distillation bridge and melted at 140° C. under an atmosphere of nitrogen maintained during the entire reaction. 3.08 kg (1.85 moles) terephthalic acid and 3 g esterification catalyst are then added under agitation. After a gradual raising of the inner temperature to 235° C. the reaction is continued until no more distillate is produced. Then, 6 g esterification catalyst are added again as well as 3 g thermal stabilizer. The temperature is raised to 250° C. and a gradual vacuum applied until an ultimate [maximum] vacuum of <1 mbar is achieved. The condensation is continued for at least 2 hours until the desired viscosity is achieved.

After having been dried 24 hours at 60° C., the polyester obtained has a melting point of approximately 157° C., a TG of approximately 0° C. and a melting viscosity of 400 Pa.s, measured at 190° C. and 2.16 kg load.

EXAMPLES 2–9

Polyesters were produced in analogy with example 1 and are collated in tables 1 and 2.

The DSC measurements were carried out on pre-dried material (24 h/70° C.).

The molar percentages cited in the following Tables 1 and 2 refer to the amount of units derived from each component in the product polymer, and are based on the total amount of acid units or diol units.

TABLE 1

|  | 1 | 2 | 3 | 4 | 5 |
|---|---|---|---|---|---|
| Terephthalic acid (molar %) | 100 | 100 | 100 | 100 | 100 |
| Butane diol (molar %) | 57 | 52 | 60 | 64 | 67 |
| Diethylene glycol (molar %) | 35 | 40 | 32 | 28 | 25 |
| Triethylene glycol (molar %) |  |  |  |  |  |
| Polyethylene glycol 600 (molar %) | 8 | 8 | 8 | 8 | 8 |
| Melting point (DSC, °C.) | 157 | 120 | 168 | 176 | 186 |
| Glass Temperature (DSC, °C.) | 0 | 1 | 4 | 1 | 5 |
| Cold crystallization point (DSC, °C.) | 24 | 42 | 27 | 22 | 29 |
| Melting viscosity 160° C., (Pa.s) | 400 | 950* | 295 | 410 | 440 |

*measured at 160° C./2.16 kg

TABLE 2

|  | 6 | 7 | 8 | 9 |
|---|---|---|---|---|
| Terephthalic acid (molar %) | 100 | 100 | 100 | 100 |
| Butane diol (molar %) | 45 | 52 | 52 | 92 |
| Diethylene glycol (molar %) | 45 | 14 | 7 |  |
| Triethylene glycol (molar %) |  | 26 | 33 |  |
| Polyethylene glycol 600 (molar %) | 10 | 8 | 8 | 8 |
| Melting point (DSC, °C.) | 144 | 107 | 108 | 209 |
| Glass Temperature (DSC, °C.) | −3 | −3 | −5 |  |
| Cold crystallization point (DSC, °C.) | 28 | 45 | 48 | 50 |
| Melting viscosity 190° C., (Pa.s) | 124 | 850* | 750* | 100** |

*measured at 160° C./2.16 kg
**measured at 230° C./2.16 kg

We claim:

1. Hot-melt adhesive masses consisting of a statistically built-up copolyether ester based on terephthalic acid and a mixture of aliphatic diols, characterized in that: terephthalic acid is used as the single acid component and its molar amount, relative to the total amount of acid, is 100 molar %; that a combination of butane diol, diethylene glycol, polyethylene glycol and triethylene glycol is present as diol component; that the molar amount of butane diol is less than 75 molar %, the amount of diethylene glycol is between 5 and 60 molar %, the amount of triethylene glycol between 0 and 40 molar % and at least 2 and at the most 10 molar % of a higher-molecular polyethylene glycol component with a molar mass of 600–4000 g/mole is used, relative to the total acid amount and total diol amount of 100 molar % in each instance; and that the melting point of the copolyether ester adhesive masses is between 90° and 190° C.

2. The copolyether ester hot-melt masses according to claim 1, characterized in that the molar amount of butane diol is between 40 and 70 molar % relative to the total amount of diol of 100 molar %.

3. The copolyether ester hot-melt masses according to claim 1, characterized in that the molar amount of diethylene glycol is between 10 and 50 molar % and the molar amount of triethylene glycol preferably between 0 and 35 molar % relative to the total amount of diol of 100 molar %.

4. The copolyether ester hot-melt masses according to claim 1, characterized in that diethylene glycol and triethylene glycol are used at the same time in a molar ratio of diethylene glycol to triethylene glycol between 5:1 and 1:3.

5. The copolyether ester hot-melt masses according to claim 1, characterized in that in order to raise the melting viscosity a tri- or polyvalent diol of up to 3 molar % at the most relative to the total amount of diol is used.

6. The copolyether ester hot-melt masses according to claim 1, characterized in that their melting point is between 100° C. and 180° C.

7. The copolyether ester hot-melt masses according to claim 1, characterized in that the melt viscosity, measured at 190° C. and 2.16 kg load according to ISO/DIN 1133, is not below 100 Pa.s, not below 200 Pa.s.

8. A hot-melt built-up copolyether ester adhesive comprising:

a single acid component of 100 molar % terephthalic acid;

a diol component comprising a mixture of butane diol, diethylene glycol, and polyethylene glycol, said butane diol being present in an amount of less than about 75 molar %, said diethylene glycol is between about 5 and 60 molar % and said polyethylene glycol is between about 2 and 10 molar %;

wherein said melting point of said adhesive masses is between 90° and 190° C.

9. The adhesive of claim 8 wherein said diol component further comprises between about 0 and 40 molar % of triethylene glycol.

10. The adhesive of claim 8 wherein said diol component further comprises diethylene glycol in an amount between about 10 and 50 molar % and triethylene glycol in an amount between about 0 and 35 molar %.

11. The adhesive of claim 10 wherein said diol component further comprises a multivalent diol of up to 3 molar %.

* * * * *